United States Patent [19]

Alstrom

[11] 3,875,306

[45] Apr. 1, 1975

[54] ANIMAL FEED SUPPLEMENT

[75] Inventor: Eric Ingemar Alstrom, Sundbyberg, Sweden

[73] Assignee: Wenner-Gren Medical Laboratory Aktiebolag Sturegaton, Stockholm, Sweden

[22] Filed: Nov. 1, 1971

[21] Appl. No.: 194,617

Related U.S. Application Data

[63] Continuation-in-part of Ser. No. 872,467, Nov. 24, 1969, abandoned, which is a continuation of Ser. No. 523,534, June 28, 1966, abandoned.

[52] U.S. Cl. .................................. 426/61, 426/53
[51] Int. Cl. ............................................ A23k 1/00
[58] Field of Search ........ 99/20, 4, 9, 57, 59, 2 VM; 195/96; 426/61, 53

[56] References Cited
UNITED STATES PATENTS

| | | | |
|---|---|---|---|
| 2,124,820 | 7/1938 | Hellinger | 99/9 |
| 2,194,672 | 3/1940 | Porter | 99/9 |
| 3,085,049 | 4/1963 | Rudy | 99/9 |
| 3,243,299 | 3/1966 | Mecho et al. | 99/2 |
| 3,420,742 | 1/1969 | Farr | 99/59 |
| 3,459,554 | 8/1969 | Hashimoto | 99/8 |

*Primary Examiner*—Lionel M. Shapiro
*Attorney, Agent, or Firm*—Strauch, Nolan, Neale, Nies & Kurz

[57] ABSTRACT

A feed additive consisting essentially of a combination of viable *Lactobacillus bulgaricus* and *Streptococcus thermophilus* bacteria and metabolic products formed during the cultivation of said bacteria.

5 Claims, No Drawings

ANIMAL FEED SUPPLEMENT

RELATED APPLICATIONS

This application is a continuation-in-part of application Ser. No. 872,467, filed Nov. 24, 1969, now abandoned which was a continuation of application Ser. No. 523,534, filed June 28, 1966, now abandoned.

BACKGROUND AND SUMMARY OF THE INVENTION

It has been previously known that with the aid of lactic acid bacteria one can utilize skim milk, buttermilk, and whey as animal feed. The products thus obtained contain, in addition to lactic acid, vitamines, sugar and other carbohydrates but no viable micro-organisms. The present invention concerns a growth promoting feed additive containing viable cells of lactic-acid-producing yoghurt bacteria, in particular the combination of *Lactobacillus bulgaricus* and *Streptococcus thermophilus* bacteria and metabolic products formed during the cultivation of said bacteria. These have been found at fermentation to produce lactic acid which consists to a large extent (usually up to 30–50 percent) of levo-lactic acid. Scientifically controlled experiements with animals have shown that the economic gain from animals raised on food furnished with additives according to the present invention is increased because the quality and value of the animal products are increased.

In recent years it has been proposed to use various feed additives to achieve a fast growth in livestock, and in this respect antibiotic additives have attracted the greatest attention. Relatively good results have been attained with these additives. More recent findings however have shown that such additives give rise to resistant bacteria strains in the livestock and it has also been established that the antibiotic substances are transferred in small amounts to humans. It has also been found that a certain risk exists for hypersensitivensss in persons who handle such feed.

It has now been found that by using a feed additive according to the present invention one can eliminate the above mentioned disadvantages and still obtain a result in livestock production which is at least as good as that previously attained by using antibiotic feed additives. Thus the desired result is obtained without the previous drawbacks. An important characteristic of fermentation with the aid of yoghurt bacteria, i.e., the combination of *Lactobacillus bulgaricus* and *Streptococcus thermophilus* bacteria is, as suggested above, that a large portion (often 30–50 percent) of the lactic acid formed at the fermentation consists of levo-lactic acid which has been found to have a very advantageous effect on the metabolism of the livestock.

The feed additives according to the invention are characterized in that the growth promoting constituent is a dry powder produced from a culture of lactic-acid-producing bacteria grown on skim milk, whey, whole milk or boullion, suitably meat boullion; said powder containing viable *Lactobacillus bulgaricus* and *Streptococcus thermophilus* bacteria and metabolic products formed during the cultivation of said bacteria.

The growth promoting constituent should suitably enter into the feed in an amount between 0.1 and 5 percent, suitably between 1 and 4 percent, calculated on the weight of the feed. The metabolic products formed during the cultivation of the bacteria also suitably enter into the thus produced additive. Amounts less than 0.1 have no appreciable effect on the animals, while amounts greater than 5 percent are economically unfeasible.

DETAILED DESCRIPTION OF THE INVENTION

The invention will be more fully explained with reference to the following examples.

EXAMPLE 1

A culture of *Lactobacillus bulgaricus* and *Streptococcus thermophilus* was cultivated in a known manner on a water bath at 42°C for 2–5 hours in skim milk. At this time the cultivation was interrupted and the culture was cooled to 15°C, and thereafter it was spray dried at 60°–65°C. A check showed that the bacteria in the obtained powder were viable.

EXAMPLE 2

40 grams of the powder produced according to Example 1 were intimately mixed with 1 kilogram of a commercial starter ration for hens (S.L.R.).

The thus obtained feed was tested with respect to the feeding effect on 24-hours old cockerels with an average weight of 38.5 grams. The birds were kept under favorable conditions in electrically heated and lighted brooders and divided into two test groups I and II each containing 50 birds.

Test group I was fed only with the basic ration. Test group II was fed with the above mentioned mixture (S.L.R.) containing 4 percent dry powder produced according to Example 1. In addition to this both groups had free access to grain. Feed consumption was checked for three different intervals as set out in the table below.

| Test Group | 1–27 days Starter Ration | Grain | 28–53 days Starter Ration | Grain | 54–62 days Starter Ration | Grain | Total Feed Consumption |
|---|---|---|---|---|---|---|---|
| I | 6.9 kg | 18.2 kg | 45.5 kg | 19.0 kg | 20.5 kg | 10.5 kg | 120.6 kg |
| II | 6.0 kg | 14.1 kg | 44.4 kg | 18.1 kg | 18.5 kg | 9.0 kg | 110.1 kg |

The body weights of the cockerels at the different time points are set out in the following table.

| Test Group | Body weight in grams at the age of | | |
|---|---|---|---|
| | 27 days | 53 days | 62 days |
| I | 261 | 604 | 798 |
| II | 265 | 608 | 815 |

As can be seen there was only a small difference in body weights of the birds after 62 days. However, the average feed intake per gram of growth and day was significantly different for the two groups. It was 2.60 grams for group I and only 2.32 grams for group II.

The addition of dry powder thus resulted in a better utilization of the feed. Each bird which received the dry powder supplement according to the present invention consumed on the average 2.202 kilograms of feed against 2.412 kilograms for each bird in the control group.

EXAMPLE 3

Since it was considered essential to test the effect of the dried powder supplement on chickens raised under less favorable conditions than that of the foregoing example, the following test was carried out in a cold, dark cowshed with an earth floor.

Thirty chickens were divided into two groups, A and B, with 15 birds each. Test group A was fed with the same starter ration as in the foregoing test and group B was given the same starter ration plus 4 percent dried powder produced according to Example 1 (S.L.R.). The results can be seen in the following table.

Body Weights in Grams

| Before the test | | At the end of the test | |
|---|---|---|---|
| Group A | Group B | Group A (Survivors) | Group B (Survivors) |
| 365 | 215 | 350 | 575 |
| 200 | 280 | 375 | 425 |
| 165 | 175 | 550 | 625 |
| 180 | 165 | 425 | 575 |
| 235 | 315 | 225 | 560 |
| 270 | 210 | 375 | 600 |
| 220 | 200 | 220 | 550 |
| 155 | 385 | Avg. wt. = 360 gr. | 650 |
| 295 | 275 | | 625 |
| 305 | 230 | | 675 |
| 185 | 220 | | 400 |
| 225 | 270 | | 525 |
| 185 | 185 | | 550 |
| 190 | 182 | | 570 |
| 250 | 265 | | Avg. wt. = 608 gr. |
| Avg. wt. = 234 gr. | Avg. wt. = 239 gr. | | |

As can be seen from the table only seven of the birds in group A survived and their weight increase was slight. All but one of the birds in group B survived and they showed good growth (608 grams versus 360 grams in the control group).

EXAMPLE 4

The feed supplement produced according to Example 1 was also tested on swine during a 4 month period. 33 young pigs with an average weight of 12.5 kilograms were divided into two test groups C and D with 17 and 16 animals respectively. The animals in each group were fed with a feed of the following composition:

| Food Intake | |
|---|---|
| Group C (17 animals) | Group D (16 animals) |
| 3050 kg. flour | 3000 kg. flour |
| 75 kg. "Vex" R growing Ration | 75 kg. "Vex" R growing Ration |
| and also 2.5 kg garbage per pig each day | and also 2.5 kg garbage per pig each day |

Test group C was also furnished during the first two months with a daily ration of 40 grams of the dried powder produced according to Example 1 and during the remaining time with 80 grams per day of this dried powder. The following results were obtained:

| | Group C | Group D |
|---|---|---|
| Live weight, at start | 12.1 kg | 12.8 kg |
| do. , at slaughter | 95.0 kg | 94.0 kg |
| weight increase | 82.9 kg | 81.2 kg |
| slaughter weight | 69.8 kg | 69.4 kg |
| feeding days | 123 | 122 |
| proceeds | 256 Sw.kr. | 245 Sw.kr. |
| Quality distribution: | | |
| Extra Prime | 40% | 21.3% |
| I | 26.7% | 28.4% |
| II | 26.06% | 35.6% |
| III | 6.6% | 14.7% |

The result of the test showed that the animals in group C had a clear weight gain in respect to the animals in control group D, and also the animals in group C gave higher quality products which resulted in an increased economic yield.

The revenue was 11 Swedish Kronor greater for the animals in the group which received the feed supplement produced according to Example 1.

These results were verified in a larger test with 92 pigs in a control group and 100 pigs in a group receiving a supplement of 7 grams per day per pig for 3 months of the dried powder according to the invention. The average slaughter price in the control group was 278 Swedish Kronor while the average price for the group receiving the supplement was 290 Swedish Kronor; thus a gain of 12 Kronor per pig. The growth period was the same in each group.

The feed additive of the invention has also been administered to cows and has resulted in an increased milk yield of the cows and a decreased consumption of feed. In addition, the frequency of mastitis cases decreased sharply.

For example, the following test results pertain to the average yield per cow, percent fat content, and number of consumed feed units per liter of produced milk before and after the outbreak of mastitis, and before and after the administration of a dried culture of *Lactobacillus bulgaricus* and *Streptococcus thermophilus*.

| Year | Average yield in liter per cow and day | % Fat Content | Consumed feed units per liter produced milk |
|---|---|---|---|
| 1962 | 10.12 | 3.58 | 0.88 |
| 1963 | 10.28 | 3.29 | 0.89 |
| Outbreak of mastitis | | | |
| 1964 | 9.9 | 3.82 | 1.01 |
| 1965 | 9.8 | 4.10 | 1.03 |
| 1966 | 9.2 | 4.10 | 1.01 |
| Treatment with Additive | | | |
| 1967 | 10.8 | 4.2 | 0.85 |

From the Table, it is evident that the yield decreased and the feed consumption increased in connection with the fact that the live stock which previously had a flow frequency of mastitis were attacked by a greater number of mastitis cases. Because of the feed additive of the invention in the amount of 20 gr per cow was added in the course of 1967, the frequency of mastitis cases in the livestock decreased at the same time as the milk yield increased and the feed consumption per liter produced milk diminished.

| The frequency of mastitis cases was | |
|---|---|
| 1964 | 36% |
| 1965 | 30% |
| 1966 | 32% |
| Treatment with Additive | |
| 1967 | 6% |

By administering the additive, the health condition of the udders was substantially improved.

The pH in the milk was on average 7.34±0.043 in 1966

7.07±0.0812 in 1967

The improvement was followed by a normalization of the milk pH.

Milk tests were taken from all cows once a month.

As further evidence of the beneficial effects of the feed additive of the invention, the following data are the result of treatment with powdered *Lactobacillus bulgaricus* and *Streptococcus thermophilus* together in cattle suffering from udder inflammation.

| Date | Number of cows | Infected udders (mastitis) | Treatment |
|---|---|---|---|
| 4/25 -67 | 23 | 18 | None |
| 6/4 | 23 | 5 | Additive |
| 6/17 | 24 | 7 | Additive |
| 10/30 | 36 | 27 | None |
| 11/21 | 38 | 25 | None |
| 1/21 -68 | 40 | 29 | None |
| 3/24 | 37 | 17 | Additive |
| 5/26 | 41 | 11 | Additive |
| 10/21 | 48 | 41 | None |

It should be particularly noted that the additive according to the invention is a dry powder which consists essentially of a combination of viable *Lactobacillus bulgaricus* and *Streptococcus thermophilus* bacteria and metabolic products formed during cultivation of these bacteria. The combination of the two bacteria strains together takes advantage of the known symbiosis which exists between the bacteria to provide an especially valuable and effective feed additive which promotes an animal's absorption of nutrient from ordinary feed.

While each bacteria species, if used alone, may have some favorable effect on animals, applicant has found that the combination of the two bacteria species together provides an unexpected and considerably more improved feed additive which very effectively promotes the animals' absorption of nutrient from ordinary feed.

The symbiotic relationship existing between the two bacterial species is generally known, e.g., as evidenced by an article entitled "Yoghurt" which appeared on pages 26–28 of the magazine "Milk Plant Monthly," November, 1951. This invention takes advantage of the known symbiosis and employs the two bacteria in combination to provide the unexpected and beneficial growth promoting results on animals as evidenced by the above examples.

What is claimed and desired to be secured by Letters Patent is:

1. The method of producing an animal feed additive consisting essentially of a combination of viable *Lactobacillus bulgaricus* and *Streptococcus thermophilus* and metabolic products formed during cultivation of said bacteria, comprising the steps of cultivating a mixed culture of *Lactobacillus bulgaricus* and *Streptococcus thermophilus* for a period in the range of from about 2 to 5 hours on skim milk or whole milk, whey or bouillon, interrupting the cultivation and cooling the culture, and thereafter drying the culture to a powder at a sufficiently low temperature to keep the bacteria of both species viable.

2. The method of claim 1, wherein the culture is cultivated at a temperature of 42°C., then cooled to a temperature on the order of 15°C., and thereafter dried at a temperature on the order of 60°–65°C.

3. The method of claim 1, wherein the cooled, cultivated culture is spray dried.

4. An animal feed additive produced by the process of claim 3.

5. The combination of an animal feed and an additive therefor as defined in claim 4, said additive being present in an amount ranging from 0.1 to 5 percent, based on the weight of the feed.

* * * * *

UNITED STATES PATENT OFFICE
CERTIFICATE OF CORRECTION

PATENT NO. : 3,875,306
DATED : April 1, 1975
INVENTOR(S) : Eric Ingemar Alstrom

It is certified that error appears in the above-identified patent and that said Letters Patent are hereby corrected as shown below:

Column 4, line 2 of the Table, change "do" to --quote marks--.

Column 4, line 10 of the Table, change "26.06%" to --26.6%--.

Column 4, line 60, change "flow" to --low--.

Column 5, line 36, before "additive" insert --feed--.

Signed and sealed this 17th day of June 1975.

(SEAL)
Attest:

RUTH C. MASON
Attesting Officer

C. MARSHALL DANN
Commissioner of Patents
and Trademarks